United States Patent [19]

Moody

[11] 4,022,914

[45] May 10, 1977

[54] PREPARATION OF YOGURT

[76] Inventor: Mary B. Moody, 3025 S. Vine St., Denver, Colo. 80210

[22] Filed: Jan. 28, 1976

[21] Appl. No.: 653,103

[52] U.S. Cl. .................................. 426/43; 99/453; 99/455; 426/34; 426/397; 426/398

[51] Int. Cl.$^2$ ........................................ A23C 9/12

[58] Field of Search ............... 426/34, 42, 43, 397, 426/398, 583; 99/453, 455; 312/214

[56] References Cited

UNITED STATES PATENTS 2,052,253   8/1936   Savary .............................. 312/214

FOREIGN PATENTS OR APPLICATIONS

| | | |
|---|---|---|
| 534,221 | 12/1956 | Canada |
| 664,926 | 9/1929 | France |
| 809,817 | 3/1937 | France |
| 4,520,539 | 6/1966 | Japan |
| 1,264,168 | 2/1972 | United Kingdom |

*Primary Examiner*—David M. Naff
*Attorney, Agent, or Firm*—Bertha L. MacGregor; Kyle W. Rost

[57] ABSTRACT

A self-timing yogurt maker is used in combination with a container holding a mixture of milk and yogurt starter culture at an initial temperature between 120° and 145° F. The yogurt maker comprises an insulated wall forming an interior cavity enclosing said container and contents, said insulated wall having thermal properties which allow said initial temperature of the container and contents to decline, at average room temperature, to approximately 90° F. over a period of 9 hours. The method of making exceptionally mild, low acid yogurt comprises heating milk to temperature from 120° to 145° F., adding yogurt starter culture, placing the mixture in a container and capping the container, and cooling the container contents in said yogurt maker by a natural temperature decline to approximately 90° F. at the end of approximately 9 hours.

2 Claims, 2 Drawing Figures

PREPARATION OF YOGURT

BACKGROUND OF THE INVENTION

1. Field of the Invention

The invention relates to containers allowing a steady and predetermined loss of heat from within. More specifically, the invention relates to containers for the incubation of yogurt and also to a method of making yogurt.

2. Description of the Prior Art

Centuries ago yogurt was manufactured by placing a bowl of yogurt mixture along side a cooking hearth and the yogurt developed over a period of days. The bowl would get hot enough for yogurt development only when the fire was hot, and cooling took place naturally as the fire died. This cooling period is recognized as the critical period in yogurt development for mild flavor and pleasing texture.

A variety of commercially manufactured yogurt makers are known, typically being powered by electricity for holding the mixture at a predetermined temperature. It is commonly recommended that the yogurt be incubated at a constant heat of about 110°–115° F. for a period of ten hours, at which time the yogurt must be removed from the constant heat yogurt maker. If not removed, the yogurt will cook into separate curds and whey. Other devices, including the Savary device to be described shortly, attempt to speed the yogurt incubation period by holding the mixture at a high temperature for prolonged time. Such rapid processing techniques characteristically produce yogurt having a sharp flavor.

A number of containers in the prior art use insulated walls to preserve heat without the addition of electrically powered heating means. Such containers include a variety of insulated storage bottles and beverage cups, but such containers have the single function of keeping their contents at a temperature as close to their original temperature when placed in the container as possible. Also, U.S. Pat. No. 2,052,253 to Savary sought to achieve non-electrically powered yogurt incubation, but required a rather elaborate system of polished metal walls for heat reflection. In addition, the Savary device, like many electric yogurt makers, attempted to speed the yogurt making process to less than the nine hours needed for a pleasing product, and could overcook the yogurt if left untended.

SUMMARY OF THE INVENTION

The invention relates to a container and method for the self-timed formation of yogurt from a preheated mixture of milk and yogurt starter culture. The invention relates more specifically to a container that loses heat from a jar of liquid preheated to a specified temperature range and placed in the container to cool for a specified period of time. Specifically, the container is designed to receive a jar of milk and yogurt starter culture at a predetermined temperature between 120° and 145° F. and allow the mixture to cool without the addition or loss of any energy other than as occurs through the walls of the container to a room of average temperature, with the drop in temperature resulting in the mixture being at approximately 90° F. after 9 hours. A container and method using the described heat loss characteristics has been found to be an optimum energy saving vehicle for the manufacture of a mild yogurt having pleasing texture and a hearty bacterial composition.

The general construction of such a yogurt maker may include an inner and outer set of side walls having an air space defined between them. The lid and bottom of the yogurt maker may conveniently be constructed of heavy insulating material, allowing the sides to be the primary source of heat loss.

An object of the invention is to control the cooling of yogurt without the need for electrical means for temperature control. This yogurt maker saves energy by starting with a yogurt mixture at its hottest temperature and allowing the yogurt to form as the original heat dissipates.

Another object is to produce yogurt of uniquely mild flavor on a consistent basis. Temperature is a highly critical factor in determining the flavor of the yogurt, and yogurt may easily be overcooked. Although the user of the present device may start with the mixture in a range of temperatures, the natural heat loss in the container is such that much of the yogurt development takes place slowly at temperatures that produce an exceptionally mild product. A more heavily insulated container could overcook the yogurt or cause an acid taste, or possibly destroy the starter culture if heat retention were prolonged in the upper ranges. A less insulated container would cause partial development only, with a great amount of uncultured milk.

Another important object is to provide a yogurt maker that does not require close timing or supervision of operation but that produces a satisfactory product even when neglected for long periods of time. This yogurt maker operates by itself without electrical power and cools to the end of needed incubation without attention. Since the temperature after about nine hours is below that needed for incubation, the yogurt cannot overcook and has not spoiled in tests when left unattended in the yogurt maker for as long as 60 hours.

A further object is to provide a yogurt maker that produces fully developed mild low acid yogurt through natural heat loss from the yogurt maker, but that will neither overcook yogurt nor require additional heat after the mixture is placed in the yogurt maker. Electrical and heat reflecting yogurt makers do not equal the unique heat loss rate found in the present device.

A further important object is to provide a yogurt maker that will produce yogurt with a starting temperature in excess of that generally recognized as allowable for yogurt forming bacteria. The yogurt mixture may be placed in this yogurt maker at temperatures over 20° above recommended starting temperatures and still produce an excellent product. Evidence suggests that the produced yogurt is of exceptionally hearty bacteria stock and can be used to culture fresh yogurt even after exceptionally long periods of storage.

Another object is to provide a yogurt maker that can use recycled glass containers. Many yogurt makers require custom-fit glass containers or special sizes or shapes. This device can use almost any common glass jar, such as a quart size mayonnaise jar.

An important object is to provide a dependable, safe, and essentially fool-proof yogurt maker. The yogurt produced by this maker is of consistently fine quality because of the built-in self-timing aspect of the yogurt maker's construction, without electrical parts to malfunction or require adjustment. The device is both self-timing and has automatic cutoff when the yogurt is fully developed.

DESCRIPTION OF THE PREFERRED EMBODIMENT

Figure 1:
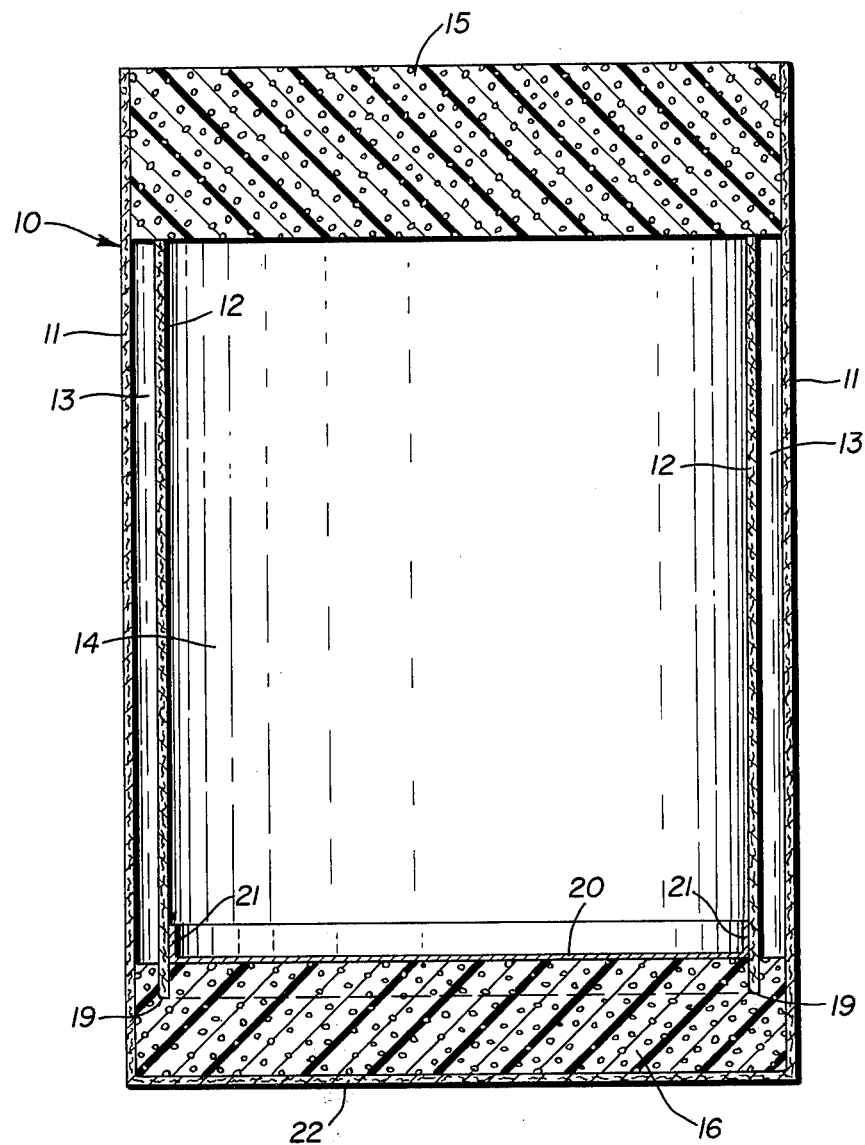
FIG. 1 is a vertical sectional view of the yogurt maker showing the constituent parts.

As shown in FIG. 1, the yogurt maker 10 has an outer side wall 11 and an inner side wall 12 together defining air space 13. The preferred shape of the yogurt maker 10 is cylindrical, making air space 13 annular about the vertical axis of the interior cavity 14. Both the lid 15 and the bottom insert 16 are constructed of insulating material, allowing the sides 11 and 12 to act as the primary sources of heat loss from the interior cavity 14 of the yogurt maker. Side walls 11 and 12 may be held in uniform position by spacing means, which may include lid 15 and bottom insert 16.

The preferred construction of a one quart size yogurt maker calls for outer side wall 11 to be a paperboard or cardboard tube 17 having approximately 0.105 inch wall thickness and the entire tube having an inside diameter of 6 inches and a height of 9 inches. The inner side wall 12 is preferably a cardboard tube 18 having wall thickness of approximately 0.140 inches and the entire tube having an inside diameter of 5⅝ inches and height of 8¼ inches. Bottom insert 16 is preferably constructed of polyurethane foam one inch thick and may have an annular groove 19 on its upper face to receive a portion of the tube 18 holding wall 12 in spaced relationship to wall 11. Alternatively, the polyurethane foam bottom may be inserted entirely within the tube 18, and because of the narrowness of air space 13, tube 18 is essentially self-centering in tube 17 making air space 13 substantially uniform without the physical centering provided by groove 19. Insert 16 may be protected on its upper face by spill tray 20, preferably constructed of washable material such as plastic. Tray 20 provides protection against spilled yogurt on insert 16 and may have an annular upwardly extending edge 21 to retain such spillage.

The yogurt maker may have bottom 22 underlying tubes 17 and 18 and insert 16 and attached to the bottom edge of tube 17. This bottom may be constructed of any material having suitable strength for supporting the yogurt maker and contents, such as metal or plastic.

Lid 15 is preferably constructed of polyurethane foam approximately 1½ inches thick and is partially inserted inside wall 11 and may rest against the top edge of wall 12.

In the method using the described yogurt maker, milk is preheated to near boiling temperature and placed in a container, for example a quart jar such as the type used for mayonnaise. When the milk has cooled to between 120° F. and 145° F. ordinary yogurt is added as a starter culture. The jar is then capped and placed in the yogurt maker and the yogurt maker is closed by lid 15. The yogurt must typically incubate for 9 hours during which time the temperature drops to approximately 90° F. at which point no further yogurt development takes place. Tests reveal that the yogurt maker loses heat rapidly during the first hour and then at a constant slower rate during the next 8 hours. This pattern of heat loss is credited with allowing production of yogurt with uniquely non-acidic flavor. In addition, the temperature decline in this device allows higher starting temperatures than are said possible in many references on yogurt making. Yogurt bacteria are said to be destroyed at temperatures in excess of 120°–124° F. but the pattern of temperature decline in the present yogurt maker allows starting temperatures as high as 145° F. with full conversion of milk to yogurt at the end of the 9 hour period.

Table 1

Representative Temperature Decline Shown in Hours of Incubation v. Temperature

| HOUR | TEMPERATURE (° F.) |
|---|---|
| 0 | 130 |
| 1 | 122 |
| 2 | 118 |
| 3 | 114 |
| 4 | 110 |
| 5 | 106 |
| 6 | 102 |
| 7 | 98 |
| 8 | 94 |
| 9 | 90 |

As shown on Table 1, the initial temperature decline is 8° per hour for the first hour followed by a decline of 4° per hour for the remaining 8 hours. The active bacteria after the initial high temperature are evidently exceptionally strong as evidenced by the ability of yogurt made at starting temperatures as high as 145° with this yogurt maker to culture new batches even when 6½ to 7 weeks old. When starting temperatures above the 130° F. of Table 1 are used, the initial hour's heat loss is greater, and with lower starting temperature, the rate of heat loss is reduced, allowing the yogurt to benefit from slower processing during the final hours of incubation and be consistently mild and low-acidic. The average temperature during the first five hours of incubation from Table 1 was 118.8° F., after which time the yogurt was not fully developed. The last four hours of incubation was at an average temperature of 98° F. and allowed the slow development that produces a mild flavor characteristic of the yogurt popular centuries ago.

Figure 2:
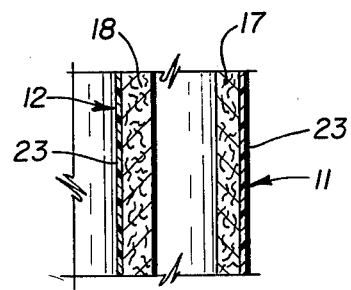
FIG. 2 is an enlarged sectional view of a portion of the walls shown in FIG. 1, showing a modification of the wall structure.

The yogurt maker may be modified as shown in FIG. 2 by applying a washable coating or covering 23 to the walls 11 and 12. This may be of decorative foil or plastic to enhance the appearance of the yogurt maker and allow easy cleaning. While the drawing shows only the inside and outside of the yogurt maker so coated, the coating could be extended to cover the facing sides of walls 11 and 12 defining air space 13. The presence of such a coating has little or no effect on the heat loss rate of the yogurt maker.

A protective washable covering on the upper surface of the bottom insert 16 may be substituted for the tray 20.

I claim:

1. The self-timing method of preparing high quality yogurt without the addition of either heating or cooling energy during yogurt incubation, comprising
   a. heating milk to a temperature near boiling and then cooling the milk to a temperature range from 120° to 145° F.,
   b. adding yogurt starter culture to the milk in said temperature range,
   c. placing the resultant milk and starter culture mixture while in said temperature range in a container at room temperature and having thermal properties that allow the mixture to decline in temperature from said temperature range to approximately 90° F. at the end of a nine hour period, and d. incubating the mixture in the container for a time not substantially less than nine hours until the temperature declines from said temperature range to approximately 90° F.

2. The method of claim 1, wherein the temperature range for addition of yogurt starter culture to milk is 130° to 145° F.